United States Patent
Jayamanne et al.

(10) Patent No.: US 9,368,158 B2
(45) Date of Patent: Jun. 14, 2016

(54) METHOD AND APPARATUS FOR RE-INSERTING A COMMERCIAL DURING PLAYBACK OF A RECORDED PROGRAM

(71) Applicant: THOMSON LICENSING, Issy de Moulineaux (FR)

(72) Inventors: Chaminda L. Jayamanne, Fishers, IN (US); David John Weaver, Fishers, IN (US); Martin Vincent Davey, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 245 days.

(21) Appl. No.: 14/038,126

(22) Filed: Sep. 26, 2013

(65) Prior Publication Data

US 2015/0086182 A1    Mar. 26, 2015

(51) Int. Cl.
*G11B 27/11* (2006.01)
*G11B 27/034* (2006.01)

(52) U.S. Cl.
CPC .............. *G11B 27/11* (2013.01); *G11B 27/034* (2013.01)

(58) Field of Classification Search
CPC ........ G11B 27/28; G11B 27/11; G11B 27/34; H04N 5/76
USPC ................... 386/249–251; 348/607; 725/115
See application file for complete search history.

(56) References Cited

U.S. PATENT DOCUMENTS

| | | | |
|---|---|---|---|
| 7,272,295 B1 * | 9/2007 | Christopher | 386/251 |
| 8,181,214 B2 * | 5/2012 | Nashida et al. | 725/115 |
| 8,375,407 B2 | 2/2013 | Tsuchida et al. | |
| 2003/0149621 A1 * | 8/2003 | Shteyn | G06Q 30/0272 705/14.68 |
| 2004/0003397 A1 | 1/2004 | Boston et al. | |
| 2004/0189873 A1 * | 9/2004 | Konig et al. | 348/607 |
| 2007/0256090 A1 | 11/2007 | Hiron et al. | |
| 2008/0127246 A1 | 5/2008 | Sylvain | |
| 2008/0152300 A1 * | 6/2008 | Knee et al. | 386/68 |
| 2010/0005487 A1 * | 1/2010 | Tsai | H04N 7/17318 725/32 |
| 2012/0114306 A1 | 5/2012 | Aldrey et al. | |

FOREIGN PATENT DOCUMENTS

| | | |
|---|---|---|
| EP | 1143721 | 10/2001 |
| WO | WO03024086 | 3/2003 |

* cited by examiner

*Primary Examiner* — Thai Tran
*Assistant Examiner* — Mishawn Hunter
(74) *Attorney, Agent, or Firm* — Robert D. Shedd; Reitseng Lin

(57) ABSTRACT

A method of playing back, by an electronic device, a recorded program without a first commercial, the recorded program recorded from a first program having the first commercial inserted therein is disclosed. The method comprises steps of obtaining location information of the first commercial in the first program responsive to a command to play back the recorded program; inserting a second commercial at a first location according to the location information of the first commercial; and playing back the recorded program with the inserted second commercial.

24 Claims, 2 Drawing Sheets

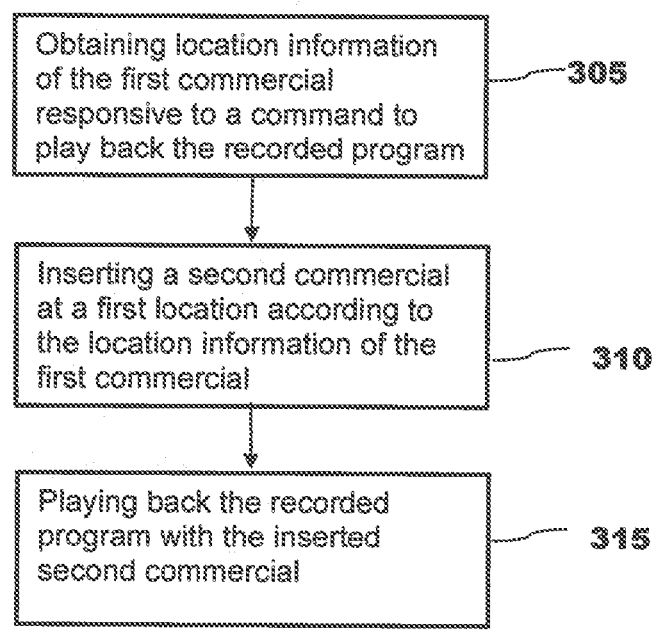

Figure 1:
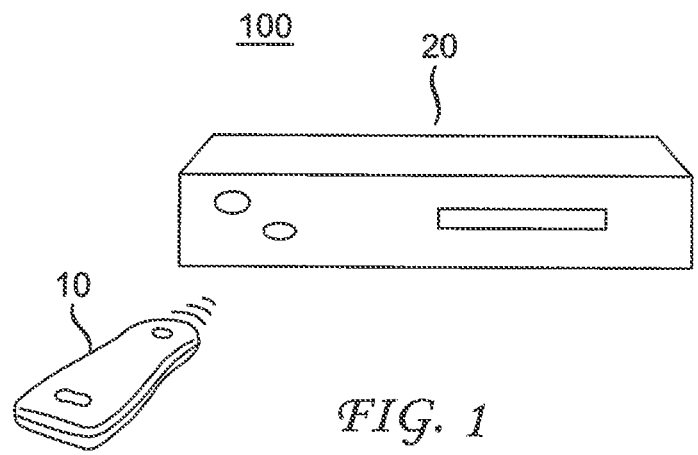

METHOD AND APPARATUS FOR RE-INSERTING A COMMERCIAL DURING PLAYBACK OF A RECORDED PROGRAM

BACKGROUND OF THE INVENTION

1. Field of the Invention

The present principles of the embodiments generally relate to a method and apparatus for recording a program without a commercial inserted therein and more particularly playing back the recorded program by re-inserting the same or different commercial at the location corresponding to the location of the commercial present in the received program.

2. Background Information

Audio and/or video apparatuses such as television receivers, digital video recorders (DVRs), personal video recorders (PVRs), and digital versatile disc (DVD) recording and playback devices may be used to record and playback audio and/or video content. Most programs received by an audio and/or video apparatus include commercials but recording the programs with the commercials reduces the number of programs that can be recorded in the apparatus.

The term "commercial" as used herein refers to a commercial presented in a commercial break. That is, when a commercial is playing, the program that a user is viewing or listening to is interrupted. Locating the boundaries of each commercial when a program is being recorded or played back thereby skipping commercials inserted therein is known. However, during playback of the recorded program no commercial is shown to the user even if the user wishes to view the commercials.

Accordingly, there is a need for a method and apparatus for skipping commercials during recording but re-insert the same or different commercials at the same locations during playback of a recorded program via an audio and/or video apparatus that avoids the foregoing problems. The present invention addresses these and/or other issues.

SUMMARY OF THE INVENTION

In accordance with an aspect of the present invention, a method of playing back, by an electronic device, a recorded program without a first commercial, the recorded program recorded from a first program having the first commercial inserted therein is disclosed. The method comprises steps of obtaining location information of the first commercial in the first program responsive to a command to play back the recorded program; inserting a second commercial at a first location according to the location information of the first commercial; and playing back the recorded program with the inserted second commercial.

The second commercial may have the same or different length from the first commercial.

In one embodiment, the method further comprises requesting a server to send the second commercial and receiving from the server the second commercial. The requesting step may comprise sending a request including an identification of the first commercial to the server.

In another embodiment, the inserting and playing back steps comprise playing back of the recorded program without the second commercial inserted, stops playing back the recorded program, playing back the second commercial, and upon completion of the playback of the second commercial, resuming playback of the recorded program.

In another embodiment, the method further comprises receiving the command to play back the recorded program and the receiving step comprises receiving a user signal selecting the recorded program.

In yet another embodiment, the method further comprises receiving the first program; determining the location information of the first commercial in the first program; recording the first program without the first commercial as the recorded program; and storing the location information of the first commercial in a memory. The location information may be stored in a memory location different from the recorded program or in a different file from the recorded program or inside the recorded program.

In yet another embodiment, the method further comprises determining if location information of a third commercial exists; if the location information of the third commercial exists, inserting a fourth commercial at a second location according to the location information of the third commercial. The third commercial is included inside the first program. In one embodiment, the method further comprises displaying a message asking a user whether to skip the third commercial during recording; if the user indicates to skip the third commercial, storing the location information of the third commercial and recording the first program without the third commercial as the recorded program; and if the user indicates not to skip the third commercial, recording the first program with the third commercial as the recorded program without storing the location information of the third commercial.

In accordance with another aspect of the present invention, an electronic device capable of playing back a recorded program without a first commercial, the recorded program recorded from a first program having the first commercial inserted therein is disclosed. The electronic device comprises a memory; and a processor executing software stored in the memory, wherein the processor is configured to obtain location information of the first commercial in the first program responsive to a command to play back the recorded program; insert a second commercial at a first location according to the location information of the first commercial; and play back the recorded program with the inserted second commercial.

In one embodiment, the processor is configured to request a server to send the second commercial and receive from the server the second commercial. The processor is configured to send a request including an identification of the first commercial to the server.

In yet another embodiment, the processor is configured to insert the second commercial and play back the recorded program with the inserted second commercial by playing back the recorded program without the second commercial inserted, stopping playing back the recorded program, playing back the second commercial, and upon completion of the playback of the second commercial, resuming playback of the recorded program.

In another embodiment, the processor is configured to receive the first program; determine the location information of the first commercial in the first program; record the first program without the first commercial as the recorded program; and store the location information of the first commercial in a memory.

In yet another embodiment, the processor is configured to determine if location information of a third commercial exists; if the location information of the third commercial exists, insert a fourth commercial at a second location according to the location information of the third commercial. The first program includes the third commercial and the processor may be configured to display a message asking a user whether to skip the third commercial during recording; if the user indicates to skip the third commercial, store the location information of the third commercial and record the first program without the third commercial as the recorded program; and if the user indicates not to skip the third commercial, record the first program with the third commercial as the recorded program without storing the location information of the third commercial.

DETAILED DESCRIPTION OF THE DRAWINGS

Figure 2:
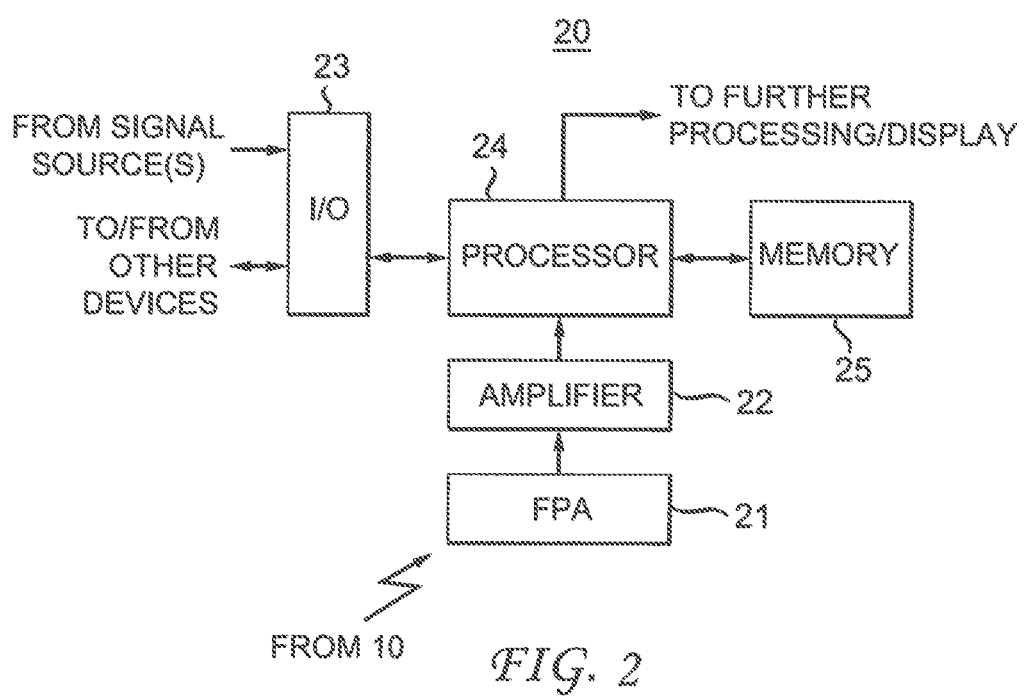

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 shows an electronic device according to an exemplary embodiment of the present invention;

FIG. 2 shows a block diagram of the electronic device of FIG. 1 according to an exemplary embodiment of the present invention; and FIG. 3 shows a flow diagram for playing back, by an electronic device, such as electronic device 20 showing FIG. 1, a recorded video program without a first commercial, the recorded program recorded from a first program having the first commercial inserted therein, according to an exemplary embodiment of the present invention.

The exemplifications set out herein illustrate preferred embodiments of the invention, and such exemplifications are not to be construed as limiting the scope of the invention in any manner.

DETAILED DESCRIPTION

Referring now to the drawings, and more particularly to FIG. 1, an exemplary environment 100 suitable for implementing the present invention is shown. As indicated in FIG. 1, environment 100 comprises a user input device 10, and an electronic device 20 capable of tuning a channel for receiving broadcast programs, recording broadcast programs, and playing back recorded broadcast programs or programs recorded in a storage device connected to the electronic device 20, such as a CD, a DVD, a Blu-ray disk, a local hard disk, or a network storage. The electronic device 20 can also play back recorded programs from another playback device connected to the electronic device 20. According to an exemplary embodiment, electronic device 20 is embodied as a television signal receiver (e.g., set-top box, a Video Cassette Recorder (VCR), a personal video recorder (PVR), a hard disk recorder (HDR), or a digital video recorder (DVR), a Blu-ray player, etc.) without an integrated display device, but may be embodied as an apparatus or device that includes an integrated display device.

User input device 10 is operative or configured to generate and output control signals that control the operation of electronic device 20 and/or other devices. According to an exemplary embodiment, user input device 10 includes a plurality of input keys and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, integrated control panel of electronic device 20, and/or other user input device.

Electronic device 20 is operative or configured to receive signals including audio, video and/or data signals having one or more types of analog modulation (e.g., NTSC, PAL, SECAM, etc.) and one or more types of digital modulation (e.g., QPSK, QAM, VSB, etc.) from one or more broadcast sources such as cable, terrestrial, satellite, internet and/or other signal sources and to provide aural/visual, aural only, and/or visual only outputs corresponding to these received signals.

Electronic device 20 is operative or configured to allow instant, time-shift and timer recordings. Time-shift recording is a system that is used temporarily to store broadcast signals for later viewing, instant recording is a system for immediate recording and timer recording is a system that is used for predefined, later recording of media content. According to the principles of the embodiments, electronic device 20 is operative or configured to detect a first commercial inserted in a first program, stores location information of the first commercial, records the first program without the first commercial as a recorded program, play back the recorded program, and insert a second commercial during the playback at a first location according to the stored location information.

Electronic device 20 is also operative or configured to process received signals and provide the resulting processed signals to one or more other devices, and to receive signals from other devices, such as a DVD player, a VCR, a PVR, a HDR, a DVR, a Blu-ray player, or a storage device.

In one embodiment, the electronic device 20 is operative or configured to allow a user to select whether to skip a commercial during recording and whether to insert a commercial at a location according to the stored location information.

Referring to FIG. 2, a diagram providing further details of the electronic device 20 of FIG. 1 according to an exemplary embodiment of the present invention is shown. Electronic device 20 of FIG. 2 comprises front panel means such as front panel assembly (FPA) 21, amplifying means such as amplifier 22, and input/output (I/O) means such as I/O block 23, processing means such as processor 24, and memory means such as memory 25. Some of the foregoing elements of FIG. 2 may be embodied using integrated circuits (ICs), and some elements may for example be included on one or more ICs. For clarity of description, certain conventional elements associated with electronic device 20 such as certain control signals, power signals and/or other elements may not be shown in FIG. 2.

FPA 21 is operative or configured to receive user inputs from user input device 10, and to output signals corresponding to the user inputs to amplifier 22. According to an exemplary embodiment, FPA 21 receives signals, such as IR and/or RF signals, from user input device 10 and generates corresponding signals which are output to amplifier 22. Amplifier 22 is operative to amplify the signals provided from FPA 21 for output to processor 24.

I/O block 23 is operative or configured to perform I/O functions of electronic device 20. According to an exemplary embodiment, I/O block 23 is operative or configured to receive signals such as audio, video and/or data signals in analog and digital modulation formats from one or more broadcast signal sources or servers such as cable, terrestrial, satellite, internet and/or other signal sources or servers. Although not expressly shown in FIG. 2, I/O block 23 may include a plurality of input terminals each designated to receive signals from a given broadcast signal source. For example, I/O block 23 may include separate input terminals for receiving signals from cable, antenna (i.e., terrestrial), satellite, internet and/or other signal sources. I/O block 23 is also operative to output processed signals to one or more other devices connected to the electronic device 20, and to receive signals from such devices. Devices connected to the electronic device 20 may include DVD players, VCRs, PVRs, HDRs, DVRs, Blu-ray players, and/or storage devices.

Processor 24 is operative or configured to perform various signal processing and control functions of electronic device 20. According to an exemplary embodiment, processor 24 processes the audio, video and/or data signals provided from I/O block 23 by performing functions including channel tuning, analog and digital demodulation, and other functions to thereby generate data representing audio, video and/or data content. The data produced from such processing functions may be provided for further processing (e.g., MPEG decoding, etc.) and output. Also according to an exemplary embodiment, processor 24 detects and processes user inputs provided via user input device 10, and may control its own operations and/or output control signals to control other elements of electronic device 20 (including elements not shown in FIG. 2) responsive to such user inputs.

Processor 24 is also operative or configured to execute software code stored, for example in memory 25, to detect a first commercial inserted in a first program, store location information of the first commercial, record the first program without the first commercial as a recorded program, insert a second commercial at a first location according to the stored location information responsive to a command to play back the recorded program, and play back the recorded program with the inserted second commercial. The second commercial may be different from the first commercial and the processor 24 may obtain the second commercial from a broadcast source or a server, which may be different from the one that delivered the first program.

Memory 25 is operative or configured to perform data storage functions of electronic device 20. According to an exemplary embodiment, memory 25 stores data including, but not limited to, software code, electronic program guide data, user preference data, recorded audio/video programs, recorded audio only programs, recorded video only programs, and/or other data. Memory 25 may include volatile and/or non-volatile memory regions and storage devices such hard disk drives, DVD drives.

Referring to now FIG. 3, an exemplary process 300 for playing back, by an electronic device, such as electronic device 20, a recorded video program without a first commercial, the recorded program recorded from a first program having the first commercial inserted therein, according to the principles of the embodiments of the invention, is shown. The first program can be audio, video, or both.

At step 305, the processor 24 obtains location information of the first commercial responsive to a command to play back the recorded program. The command to play back may be generated by a user selecting one of the recorded programs stored in the memory 25 or a storage device (not shown), such as a USB drive, connected to the electronic device 20 through the I/O block 23.

The location information of the first commercial indicates where a second commercial, if inserted into the recorded program, should be in the recorded program. From the location information, the processor 24 should be able to determine the starting location in the recorded program for inserting the second commercial. The starting location determined from the location information of the first commercial should correspond to the location of the first commercial in the first program. That is, the pictures in the first program before and after the first commercial should be respectively the same pictures within a predefined number, such as four, of pictures away from those in the recorded program before and after the second commercial.

During recording, it is necessary to detect the boundary of the first commercial in order to remove the first commercial during recording. The location indication may be just a predefined mark in the recorded program, so that the processor 24 can detect the predefined mark. The location information can also be stored in a different file from the recorded program. The location information may be the time required to play the recorded program to the start of the commercial break for the first commercial. The file may be called a tag file associated with the recorded program and when the recorded program is selected for playing back, the processor 24 is able to find the tag file with a predefine association between the recorded program and the tag file. For example, the file names of the recorded program and the associated tag file may be prefixed, infixed, or post fixed with the same character string, and the common character sting is used by the processor 24 as the association between the two files. In another embodiment, the location information may be stored in a predefined memory location different from the memory location for storing the recorded program.

If the location information is stored in the tag file, the location information may just the location in the file storing the recorded program. The location information may also include the time required to play back the first commercial.

In one embodiment, the processor 24 records the recorded program from the first program received from one of the broadcast signal sources or servers. A copy of the first commercial is not stored locally, for example, in order to save the local storage space.

At step 310, the processor 24 inserts the second commercial at a first location according to the location information of the first commercial. If the location information is stored as a predefined mark in the recorded file, the predefined mark should be removed after the insertion of the second commercial. In one embodiment, the second commercial is the first commercial. The processor 24 may request a copy of the second commercial from a broadcast source or a server, which may be the same or different broadcast source or server supplying the first program. The processor 24 should include in the request an identification of the first commercial. The identification can be program information of the recorded program, such as program title of the recorded program. The identification of the first commercial may also include ordinal number of the first commercial among all the commercials included in the first program. The identification can also be included in metadata (e.g., an electronic program guide). In response to the request, if the ordinal number of the first commercial or the identification in the metadata indicating the first commercial is included in the request, the broadcast source may send a copy of the first commercial or a different commercial having a longer, shorter or same length (time to play back a commercial) and the processor 24 selects the received commercial as the second commercial. If the time to play back both commercials is the same, the two commercials are considered to have the same length. If the ordinal number of the first commercial is not included in the request, the server may send a group of commercials related to the recorded program for the processor 24 to select one of the received commercials as the second commercial. The server may analyze what type of audience would be interested in viewing or listening to the recorded program and select the group of commercials more suited for this type of audience.

In one embodiment, the request may not include any identification of the first commercial and the server simply decides a group of commercials for any advertising consideration and sends them for the processor 24 to select one as the second commercial. The processor 24 may select a predefined one, select a different one each time the recorded program is played back, or randomly select one of the received commercials.

In another embodiment, if the server does not respond in time, for example, within a predetermined time of, for example, five seconds, the first commercial is not replaced but is not played back. The processor 24 may pause for the time up to the playback interval of the first commercial unless the user activates a key or button to skip the commercial break. The processor 24 may simply continue to play the video without the first commercial after the predetermined time has elapsed. The predetermined time should be user settable and the processor 24 should allow the user to select having a break or continuing to play back.

At step 315, the processor 24 plays back the recorded program with the inserted second commercial. The recorded program with the inserted second commercial is stored in a temporary file and is deleted after the playback.

In another embodiment, the processor 24 does not insert the second commercial into the recorded program before playing back. Rather, the processor 24 plays back the recorded program, stops the playback at the first location, plays back the second commercial, and upon completion of the playback of the second commercial, resumes playback of the recorded program.

In another embodiment, the first program may include a third commercial. The processor 24 detects the boundary of the third commercial and stores the location information of the third commercial similar to the location information of the first commercial. Again the location information of the third commercial can be a mark inside the recorded program or can be the time to play the recorded program to the start of the third commercial. Thus, the time to play back a skipped commercial is not included in the location information and the time to play back the inserted commercial during playback is also not included in the location information. The processor 24 records the recorded program from the first program without the first and the third commercials.

In another embodiment, during recording, the processor 24 upon detecting the presence of the third commercial, displays a message asking the user whether to skip the third commercial. If the user indicates to skip the third commercial, the processor 24 stores the location information and skip the third commercial in the recorded program as described above. If the user indicates not to skip the third commercial, the processor 24 does not record the location information of the third commercial and does not skip the third commercial in the recorded program.

Thus, the processor 24 should determine if location information of another commercial, for example, the third commercial, exists. If it exists, the processor 24 should insert a fourth commercial at a second location according to the location information of the third commercial. Again, the fourth commercial and the third commercial may be the same or different.

The recorded program may be an audio/video signal, such as a television program, a video only signal, such as a commercial, or an audio only signal, such as a song.

The broadcast source may be a cable, terrestrial, satellite, internet and/or another signal source. A broadcast source may also serve as a server for transmitting commercials in addition to programs.

In another embodiment, responsive to the command to play back the recorded program, the processor 24 provides a message asking the user whether to insert a commercial. If the user indicates to insert the commercial, the process proceeds as described above. If the user indicates not to insert the commercial, the processor 24 plays back the recorded program without inserting the commercial. If the location information is in the same file as the recorded program, the processor 24 should remove the location information before playing back the recorded program.

In another embodiment, responsive to play back the recorded program, the processor 24 does not provide the user a choice to skip a predefined commercial, for example, the first commercial, but allow the user to decide whether to insert each of the other skipped commercial.

In yet another embodiment, the processor 24 provides the user an option to insert all of replacements of the skipped commercials.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of playing back, by an electronic device, a recorded program without a first commercial, the recorded program recorded from a first program having the first commercial inserted therein, comprising:
   obtaining location information of the first commercial in the first program responsive to a command to play back the recorded program;
   inserting a second commercial at a first location according to the location information of the first commercial;
   playing back the recorded program with the inserted second commercial;
   determining if location information of a third commercial in the first program exists;
   if the location information of the third commercial exists, inserting a fourth commercial at a second location according to the location information of the third commercial;
   displaying a message asking a user whether to skip the third commercial during recording;
   if the user indicates to skip the third commercial, storing the location information of the third commercial and recording the first program without the third commercial as the recorded program; and
   if the user indicates not to skip the third commercial, recording the first program with the third commercial as the recorded program without storing the location information of the third commercial.

2. The method of claim 1, wherein the second commercial has the same length as the first commercial.

3. The method of claim 1, wherein the first commercial is different from the second commercial.

4. The method of claim 1, further comprising receiving from a server the second commercial.

5. The method of claim 4, further comprising requesting the server to send the second commercial.

6. The method of claim 5, wherein the requesting comprises sending a request including an identification of the first commercial to the server.

7. The method of claim 1, wherein the inserting and the playing back comprise playing back of the recorded program without the second commercial inserted, stops playing back the recorded program, playing back the second commercial, and upon completion of the playback of the second commercial, resuming playback of the recorded program.

8. The method of claim 1, further comprising receiving the command to play back the recorded program.

9. The method of claim 8, wherein the receiving comprises receiving a user signal selecting the recorded program.

10. The method of claim 1, wherein the location information is stored in a memory location different from the recorded program.

11. The method of claim 1, wherein the location information is stored in a different file from the recorded program.

12. The method of claim 1, wherein the location information is stored inside the recorded program.

13. An electronic device capable of playing back a recorded program without a first commercial, the recorded program recorded from a first program having the first commercial inserted therein, the electronic device comprising:
   a memory; and
   a processor executing software stored in the memory, wherein the processor is configured to obtain location information of the first commercial in the first program responsive to a command to play back the recorded program; insert a second commercial at a first location according to the location information of the first commercial; and play back the recorded program with the inserted second commercial; and
   the processor is further configured to determine if location information of a third commercial in the first program exists; if the location information of the third commercial exists, insert a fourth commercial at a second location according to the location information of the third commercial; display a message asking a user whether to skip the third commercial during recording; if the user indicates to skip the third commercial, store the location information of the third commercial and record the first program without the third commercial as the recorded program; and if the user indicates not to skip the third commercial, record the first program with the third commercial as the recorded program without storing the location information of the third commercial.

14. The electronic device of claim 13, wherein the second commercial has the same length as the first commercial.

15. The electronic device of claim 13, wherein the first commercial is different from the second commercial.

16. The electronic device of claim 13, wherein the processor is configured to receive from a server the second commercial.

17. The electronic device of claim 13, wherein the processor is configured to request the server to send the second commercial.

18. The electronic device of claim 16, wherein the processor is configured to send a request including an identification of the first commercial to the server.

19. The electronic device of claim 13, wherein the processor is configured to insert the second commercial and play back the recorded program with the inserted second commercial by playing back the recorded program without the second commercial inserted, stopping playing back the recorded program, playing back the second commercial, and upon completion of the playback of the second commercial, resuming playback of the recorded program.

20. The electronic device of claim 13, wherein the processor is configured to receive the command to play back the recorded program.

21. The electronic device of claim 20, wherein the processor receives the command by receiving a user signal selecting the recorded program.

22. The electronic device of claim 13, wherein the location information is stored in a memory location different from the recorded program.

23. The electronic device of claim 13, wherein the location information is stored in a different file from the recorded program.

24. The electronic device of claim 13, wherein the location information is stored inside the recorded program.

* * * * *